United States Patent
Wardle et al.

(10) Patent No.: US 12,023,632 B2
(45) Date of Patent: Jul. 2, 2024

(54) PROCESS FOR REDUCING INJECTOR DEPOSITS

(71) Applicant: SHELL OIL COMPANY, Houston, TX (US)

(72) Inventors: Robert Wilfred Matthews Wardle, London (GB); Johannes Leendert Willem Cornelis Den Boestert, Amsterdam (NL); Nicholas James Rounthwaite, London (GB); Huw Jones, London (GB)

(73) Assignee: SHELL USA, INC., Houston, TX (US)

(*) Notice: Subject to any disclaimer, the term of this patent is extended or adjusted under 35 U.S.C. 154(b) by 197 days.

(21) Appl. No.: 17/638,327

(22) PCT Filed: Sep. 23, 2020

(86) PCT No.: PCT/EP2020/076525
§ 371 (c)(1),
(2) Date: Feb. 25, 2022

(87) PCT Pub. No.: WO2021/058537
PCT Pub. Date: Apr. 1, 2021

(65) Prior Publication Data
US 2022/0401895 A1 Dec. 22, 2022

(30) Foreign Application Priority Data
Sep. 25, 2019 (EP) .................... 19199620

(51) Int. Cl.
*B01D 71/70* (2006.01)
*B01D 61/02* (2006.01)
(Continued)

(52) U.S. Cl.
CPC ......... *B01D 71/701* (2022.08); *B01D 61/027* (2013.01); *B01D 71/32* (2013.01);
(Continued)

(58) Field of Classification Search
CPC ...... B01D 61/027; B01D 71/32; B01D 71/70; B01D 71/701; C10G 31/09; C10G 31/11;
(Continued)

(56) References Cited

U.S. PATENT DOCUMENTS 3,440,264 A * 4/1969 McVannel ............. B01D 71/70
210/500.21
3,919,075 A * 11/1975 Parc ..................... C10M 175/06
208/182

(Continued)

FOREIGN PATENT DOCUMENTS

DE 102009044866 A1 * 6/2010 ......... F02M 37/0029
DE 102015204335 A1 * 9/2016
(Continued)

OTHER PUBLICATIONS

International Search Report and Written Opinion received for PCT Patent Application No. PCT/EP2020/076525, mailed on Dec. 3, 2020, 09 pages.

*Primary Examiner* — John M Zaleskas
(74) *Attorney, Agent, or Firm* — SHELL USA, INC.

(57) ABSTRACT

A process for reducing injector deposits in an internal combustion engine fuelled with a fuel composition, the process comprising contacting a fuel composition with a metal-selective membrane situated in the fuel delivery system. The reduction of such deposits provides an increase in fuel efficiency, fuel thermal stability, boost in engine cleanliness, improves fuel economy and enables the possibility of using a reduced amount of expensive detergent in the fuel composition.

11 Claims, 4 Drawing Sheets

(51) Int. Cl.
  *B01D 71/32*   (2006.01)
  *C10G 31/09*   (2006.01)
  *C10G 31/11*   (2006.01)
  *C10G 75/00*   (2006.01)
  *F02M 37/00*   (2006.01)
  *F02M 37/22*   (2019.01)
  *F02M 37/32*   (2019.01)
  *F02M 37/34*   (2019.01)

(52) U.S. Cl.
  CPC .............. *B01D 71/70* (2013.01); *C10G 31/09* (2013.01); *C10G 31/11* (2013.01); *C10G 75/00* (2013.01); *F02M 37/0052* (2013.01); *F02M 37/22* (2013.01); *F02M 37/32* (2019.01); *F02M 37/34* (2019.01); *F02M 2200/05* (2013.01); *F02M 2200/9015* (2013.01); *F02M 2200/9053* (2013.01)

(58) Field of Classification Search
  CPC .............. C10G 75/00; F02M 2200/05; F02M 2200/9015; F02M 2200/9053; F02M 37/0047; F02M 37/0052; F02M 37/22; F02M 37/32; F02M 37/34
  See application file for complete search history.

(56) References Cited

U.S. PATENT DOCUMENTS

| | | | | |
|---|---|---|---|---|
| 4,543,938 | A * | 10/1985 | Szlaga | F02M 37/0023 123/514 |
| 4,748,288 | A * | 5/1988 | Bitter | B01D 61/026 585/818 |
| 5,093,002 | A * | 3/1992 | Pasternak | B01D 71/70 210/500.37 |
| 5,102,551 | A * | 4/1992 | Pasternak | B01D 71/70 210/651 |
| 5,133,851 | A * | 7/1992 | Bitter | B01D 71/70 585/818 |
| 5,149,433 | A * | 9/1992 | Lien | F02D 33/006 210/779 |
| 9,388,777 | B2 | 7/2016 | Ahmad | |
| 2002/0007587 | A1 * | 1/2002 | Geus | C07C 7/144 210/500.21 |
| 2002/0017490 | A1 * | 2/2002 | Cossee | C10G 31/11 210/651 |
| 2004/0256320 | A1 * | 12/2004 | Den Boestert | B01D 65/08 210/651 |
| 2005/0119517 | A1 * | 6/2005 | Millington | B01D 61/027 585/818 |
| 2005/0150480 | A1 * | 7/2005 | Hoffmann | F02M 53/00 123/541 |
| 2005/0155585 | A1 * | 7/2005 | Bradford | F02M 37/30 123/510 |
| 2006/0156620 | A1 * | 7/2006 | Clayton | C10G 21/00 44/457 |
| 2009/0014359 | A1 * | 1/2009 | Den Boestert | C10G 31/11 208/309 |
| 2009/0065432 | A1 * | 3/2009 | Den Boestert | B01D 65/02 210/651 |
| 2009/0159054 | A1 * | 6/2009 | Suzuki | F02M 59/16 123/506 |
| 2010/0105959 | A1 * | 4/2010 | Beckers | C07D 301/32 568/621 |
| 2010/0147745 | A1 * | 6/2010 | Den Boestert | B01D 71/70 208/91 |
| 2013/0131199 | A1 * | 5/2013 | Lien | C01B 3/342 252/373 |
| 2014/0021118 | A1 * | 1/2014 | Shafer | B01D 29/56 210/232 |
| 2014/0142205 | A1 * | 5/2014 | Brinkmann | C10G 2/50 518/705 |
| 2014/0151303 | A1 * | 6/2014 | Bagatin | B01J 20/16 210/650 |
| 2014/0183112 | A1 * | 7/2014 | Ahmad | F02M 37/0023 210/130 |
| 2014/0224215 | A1 * | 8/2014 | Lehman | F02M 37/32 210/136 |
| 2014/0331974 | A1 * | 11/2014 | Ahmad | F02M 37/12 123/495 |
| 2017/0184110 | A1 * | 6/2017 | Marrack | F04D 15/0072 |
| 2017/0254299 | A1 * | 9/2017 | Smith | B01D 35/005 |
| 2018/0223764 | A1 * | 8/2018 | Marrack | F02D 41/3082 |
| 2021/0122995 | A1 * | 4/2021 | Chandrasekaran | A61K 8/922 |
| 2021/0355388 | A1 * | 11/2021 | Haan | B01D 61/027 |
| 2022/0380327 | A1 * | 12/2022 | Den Boestert | C07D 301/32 |

FOREIGN PATENT DOCUMENTS

| | | | | |
|---|---|---|---|---|
| JP | 2006105092 | A * | 4/2006 | |
| KR | 101545167 | B1 * | 8/2015 | |
| WO | 9627430 | A1 | 9/1996 | |
| WO | 2006108854 | A1 | 10/2006 | |
| WO | WO-2011105966 | A1 * | 9/2011 | ........ B01D 61/027 |
| WO | 2017203003 | A1 | 11/2017 | |

* cited by examiner

PROCESS FOR REDUCING INJECTOR DEPOSITS

CROSS REFERENCE TO RELATED APPLICATIONS

This is a National stage application of International application No PCT/EP2020/076525, filed Sep. 23, 2020, which claims priority of European application No. 19199620.6, filed 25 Sep. 2019 which is incorporated herein by reference in its entirety.

FIELD OF THE INVENTION

The present invention relates to a process for reducing injector deposits in an internal combustion engine (ICE).

BACKGROUND OF THE INVENTION

The build-up of deposits arising from fuel combustion in an engine reduces the efficiency of further combustion and leads to inefficient use of fuel over the lifetime of an engine. A common problem with diesel engines is fouling of the injector, particularly the injector body and the injector nozzle. Injector nozzle fouling occurs when the nozzle becomes blocked with deposits from the diesel fuel. Deposits are also known to occur at the injector tip. In addition to these "external" injector deposits in the nozzle hole and at the injector tip which lead to reduced flow and power loss, deposits may occur within the injector body causing further problems. These deposits may be referred to as internal diesel injector deposits, or IDIDs. IDIDs include deposits at the needle seat and upstream within the injector and exclude deposits in the injector nozzle holes. IDIDs occur inside the injector on the critical moving parts. IDIDs can hinder the movement of these parts affecting the timing and quantity of fuel injection and have other undesirable effects. Since modern diesel engines operate under very precise conditions these deposits can have a significant impact on performance. IDIDs can cause several problems, including power loss, engine breakdowns, rough idle and reduced fuel economy due to less than optimal fuel metering and combustion. Initially the user may experience cold start problems and/or rough engine running. Eventually, these deposits can lead to more serious injector sticking. This occurs when the deposits stop parts of the injector from moving and thus the injector stops working. When one or more of the injectors stick the engine may fail completely.

Fuels, more specifically a fuel composition, can contain several trace metals. The content of such metals depends on a variety of factors, for example: the sources of crude oil from which the fuel is derived, the types of refinery processes employed, and the handling, storage and distribution history of the fuel. An example of this may be metal contamination arising from storage of a fuel composition in a fuel tank situated within a fuel delivery system of a vehicle. Another example may be metal contamination arising from an oil lubricated high-pressure pump. It is known that the lubricating oil lining the walls of the high-pressure pump may contain metals such as zinc and/or calcium, wherein the lubricating oil may pass through the seal of the high-pressure pump and contaminate the fuel within the fuel line of the fuel delivery system. Within the field of fuels technology, it is known that the presence of metals has a negative impact on fuel thermal stability. During combustion, this will result in fouling phenomena, e.g. formation of gum-like material on fuel injectors. Therefore, it would be desirable to reduce the metal content of the fuel composition which reduces deposit formation in the injectors located in an internal combustion engine of a vehicle.

It is known to use membranes, such as polydimethylsiloxane membranes, for separating various metals from a hydrocarbon mixture. Such application is described in U.S. Pat. No. 5,133,851.

A more recent patent application that describes the use of nano-filtration in relation to fuel purification is US2005/119517A.

In US Patent Application No. 2006/0156620 a method for reducing deposit formation is disclosed. This patent application mentions a fuel composition that has been treated with a metal adsorbing or absorbing material in order to reduce subsequent formation of deposits. It further discloses that the metal adsorbing or absorbing material may comprise polymeric adsorbents or absorbents.

It is known to position a filter in a kidney loop configuration within a fuel management system. U.S. Pat. No. 9,388,777 discloses a kidney loop filtration system for a fuel management system, wherein the kidney loop system is configured to provide fuel from a tank to a fuel transfer pump. A filter is positioned downstream of the pump to remove impurities or contaminants.

SUMMARY OF THE INVENTION

Described herein is a process for reducing injector deposits, especially internal diesel injector deposits (IDIDs), in an internal combustion engine fuelled with a fuel composition, wherein the fuel composition is contacted with a metal-selective membrane situated in various locations within a fuel delivery system.

According to a first aspect of the present invention there is provided a process for reducing injector deposits in an internal combustion engine which is fuelled with a fuel composition, wherein the process comprises contacting the fuel composition with a metal-selective membrane situated in the return line of a fuel delivery system which is configured to provide the fuel composition from an injector situated in the internal combustion engine to a fuel tank.

According to a second aspect of the present invention there is provided a process for reducing injector deposits in an internal combustion engine which is fuelled with a fuel composition, the process comprising contacting the fuel composition with a metal-selective membrane situated in a kidney loop filtration system which is configured to act upon the fuel tank.

According to a third aspect of the present invention there is provided a process for reducing injector deposits in an internal combustion engine which is fuelled with a fuel composition, the process comprising contacting the fuel composition with a metal-selective membrane situated in the return line of a fuel delivery system which is configured to provide the fuel composition from an injector situated in an internal combustion engine to a fuel filter.

According to a fourth aspect of the present invention there is provided a process for reducing injector deposits in an internal combustion engine which is fuelled with a fuel composition, the process comprising contacting the fuel composition with a metal-selective membrane situated in the low-pressure line of a fuel delivery system which is configured to provide the fuel composition from the fuel tank to the injector.

The present invention provides a way to reduce the metal content of a fuel composition and reduces injector deposits, such as internal diesel injector deposits (IDIDs), within an internal combustion engine. Therefore, the present invention further provides an increase in fuel efficiency, increase in fuel thermal stability, boost in engine cleanliness, improved fuel economy and enables the possibility of using a reduced amount of expensive detergent in the fuel composition.

DETAILED DESCRIPTION OF THE INVENTION

It is an object of the present invention to provide a process for reducing injector deposits in an internal combustion engine fuelled by a fuel composition. This object is achieved by removing trace metals from the fuel composition using a non-porous (no pores) or nanofiltration (pores having an average size of at most 5 nm) membrane. Such non-porous and nanofiltration membranes are commonly referred to in the art as dense membranes and work in a similar way, which is based on the solubility and diffusivity aspects of the membrane barrier.

Accordingly, in the process of the present invention trace metals are removed from the fuel composition by membrane separation, wherein the membrane has an average pore size of 0.5 to 5 nm. Preferably, the membrane to be used in the present invention is resistant to gasoline or diesel fuel compositions. This implies that the membrane does not dissolve in the fuel composition which it has to purify.

The dense membrane to be used in the present invention may be of the polymeric type. Preferably, the membrane used is hydrophobic because the stream to be treated is a hydrocarbon stream which should be capable of passing through the membrane.

In a preferred embodiment of the present invention, the dense membrane is a polymeric membrane. Such polymeric membranes are preferably cross-linked to provide the necessary network for avoiding dissolution of the membrane once in contact with the fuel. In general, cross-linking can be conducted in several ways, for instance by reaction with cross-linking agents (chemical cross-linking) and/or by irradiation. Preferably, the membrane layer has a siloxane structure which has been cross-linked by means of irradiation, as is for example described in WO-A-9627430. Examples of suitable, presently available cross-linked non-porous or nanofiltration membranes are cross-linked silicone rubber-based membranes, of which the cross-linked polysiloxane membranes are a particularly useful group of membranes. Such cross-linked polysiloxane membranes are known in the art, for example from U.S. Pat. No. 5,102,551.

Typically, the polysiloxanes used contain the repeating unit —Si—O—, wherein the silicon atoms bear hydrogen or a hydrocarbon group.

Preferably, the repeating units are of the formula (I)

$$—Si(R)(R')—O— \quad (I)$$

wherein R and R' may be the same or different and represent hydrogen, halogen or a hydrocarbon group selected from alkyl, aralkyl, cycloalkyl, aryl, and alkaryl groups.

Preferably, at least one of the groups R and R' is an alkyl group, more preferably both groups are alkyl groups and most preferably methyl groups. The alkyl group may also comprise a 3,3,3-trifluoropropyl group.

The dense membrane is typically supported on at least one porous substrate layer, acting as a base layer to provide the necessary mechanical strength. Suitably, the porous substrate layer is made of a porous material of which the pores have an average size greater than 5 nm. Such porous material may be a microporous, mesoporous or macroporous material which is normally used for microfiltration or ultrafiltration, such as poly(acrylonitrile).

The thickness of the base layer should be sufficient to provide the necessary mechanical strength. In addition, this substrate may be supported on further porous support to provide the required mechanical strength. Typically, the thickness of the base layer is from 100 μm to 250 μm, preferably from 20 μm to 150 μm. When the non-porous membrane is combined with such base layer, the membrane has a preferable thickness of 0.5 μm to 10 μm and more preferably from 1 μm to 5 μm.

The combination of a thin top membrane layer and a thick porous support layer is often referred to as composite membranes or thin film composites. The membrane is suitably arranged so that the permeate flows first through the membrane top layer and then through the base layer, so that the pressure difference over the membrane pushes the top layer onto the base layer.

Suitable porous materials for the base layer having an average pore size of greater than 5 nm, are: poly(acrylonitrile), poly(amideimide)+$TiO_2$, poly(etherimide), polyvinylidenedifluoride and poly(tetrafluoroethylene). Poly(acrylonitrile) is especially preferred. The preferred combination for use in the present invention is a poly(dimethylsiloxane)-poly(acrylonitrile) combination.

An advantage of using non-porous membranes over porous membranes is that there is no plugging effect. This means that there is no possibility of the membrane becoming blocked by larger molecules plugged in the pores. This could happen when using a porous membrane and as a result of which it becomes increasingly difficult to regenerate a stable flux. Therefore, it is preferred for the purpose of the present invention to use a non-porous or dense membrane. Further details of suitable membranes for this application can be seen in U.S. Patent Application No. 20100105959.

The term "metals" or "trace metals" as used throughout the present specification in relation to the present invention, refers to metals selected from transition metals, post-transition metals, alkali metals, and alkaline earth metals, and mixtures thereof.

In general, in a process for removing metals from a fuel composition by membrane separation, a liquid feed comprising a fuel composition containing trace metals, suitably selected from Zn, Cu, Fe, Na, K, Ca and Mg, and mixtures thereof, is separated by the membrane into a permeate comprising a fuel composition with either no trace metals or trace metals at a concentration which is lower than the metal concentration in the feed, and a retentate comprising a fuel composition containing metals at a concentration which is higher than the metal concentration in the feed.

In another embodiment of the present invention the trace metals removed are selected from Zn, Cu, Na and Ca, and mixtures thereof.

In an especially preferred embodiment of the present invention the trace metal removed is Zn.

The present invention can be used to remove a combination of the trace metals disclosed herein.

The present invention provides a process for reducing injector deposits in an internal combustion engine fuelled with a fuel composition, preferably wherein the fuel composition comprises gasoline or diesel.

The process according to the present invention can be applied to a variety of engine types, including but not limited to diesel engines, gasoline engines, jet engines, hybrid engines and low temperature combustion (LTC) engines, and the like.

The process described herein may be used to remove Zn and/or other metals at any point in the supply chain; which, for example, may comprise the metal-selective membrane to be applied either before or in the transportation of a fuel by ship, pipeline, storage truck and/or road tanker to a retail station, within a fuel tank situated at a retail station, during the refuelling process of an on-road vehicle, or any combination disclosed herein.

Figure 1:
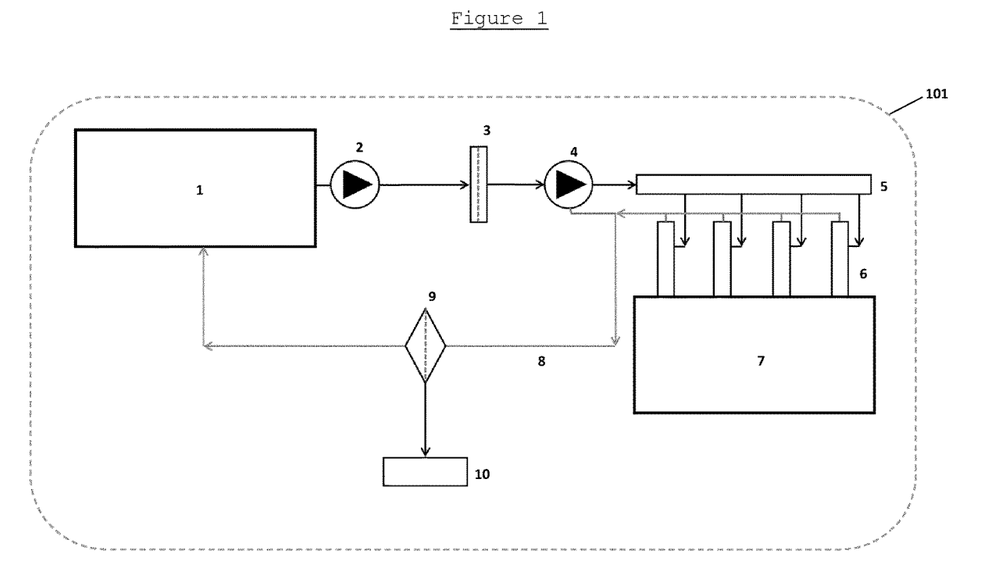
FIG. 1 is a block diagram which illustrates a fuel delivery system, wherein the metal-selective membrane is situated in the return line which is configured to provide the fuel composition from an injector situated in an internal combustion engine to the fuel tank.

FIG. 1 illustrates a block diagram of a first configuration for a fuel delivery system 101 of a vehicle in accordance with the concepts of the present disclosure. The fuel delivery system may comprise a fuel tank 1 which holds the fuel, a low-pressure pump 2 which pumps the fuel towards the fuel filter 3, filtering out large contaminants that may be present in the fuel before the fuel reaches the high-pressure pump 4, pumping the fuel through the common rail 5, into the fuel injectors 6, and injecting the fuel into the internal combustion engine 7. Any excess fuel is transported via the return line 8, which feeds the fuel through the metal-selective membrane 9, removing trace metals from the fuel composition. The permeate is then transported back to the fuel tank and the retentate is captured in a waste tank 10.

Figure 2:
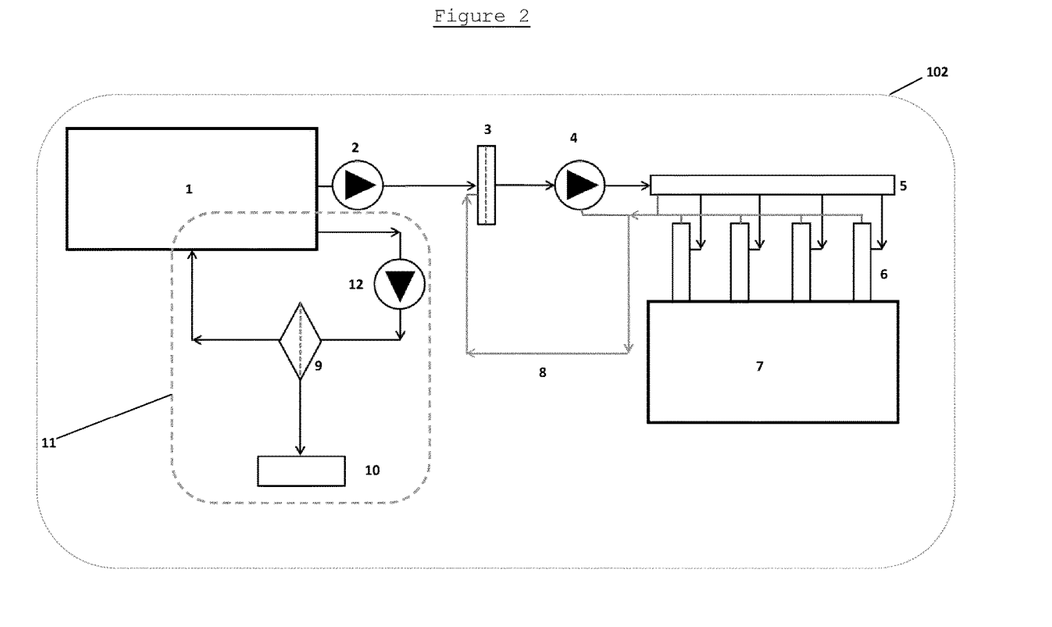
FIG. 2 is a block diagram which illustrates a fuel delivery system, wherein the metal-selective membrane is situated in a kidney loop configuration.

FIG. 2 illustrates a block diagram of a second configuration for a fuel delivery system 102 of a vehicle, in accordance with the concepts of the present disclosure. The fuel delivery system may comprise a fuel tank 1 which holds the fuel, a low-pressure pump 2 which pumps the fuel towards the fuel filter 3, filtering out large contaminants that may be present in the fuel before the fuel reaches the high-pressure pump 4, pumping the fuel through the common rail 5, into the fuel injectors 6, and injecting the fuel into the internal combustion engine 7. Any excess fuel is transported via the return line 8, which feeds the fuel back to the fuel filter 3, therefore transporting the fuel back into the system. Simultaneously, fuel can be transferred from the fuel tank 1 into a kidney loop filtration system 11, which comprises a fuel pump 12 which pumps the fuel through the kidney loop filtration system 11, to the metal-selective membrane 9, removing trace metals from the fuel. The permeate is transported back to the fuel tank 1, whilst the retentate is collected in a waste tank 10, the contents of which can be disposed of when refuelling, or during regular maintenance of the vehicle.

Figure 3:
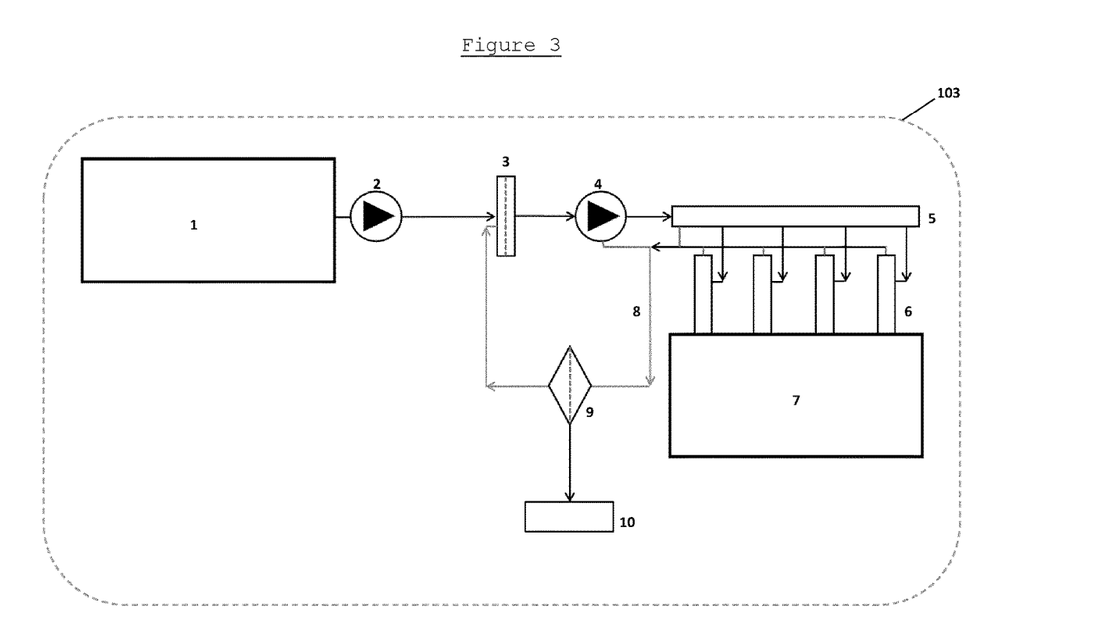
FIG. 3 is a block diagram which illustrates a fuel delivery system, wherein the metal-selective membrane is situated in the return line which is configured to provide the fuel composition from an injector situated in an internal combustion engine to a fuel filter.

FIG. 3 illustrates a block diagram of a third configuration for a fuel delivery system 103 of a vehicle in accordance with the concepts of the present disclosure. The fuel delivery system may comprise a fuel tank 1 which holds the fuel, a low-pressure pump 2 which pumps the fuel towards the fuel filter 3, filtering out large contaminants within the fuel before the fuel reaches the high-pressure pump 4, pumping the fuel through the common rail 5, into the fuel injectors 6, and injecting the fuel into the internal combustion engine 7. Any excess fuel is transported via the return line 8, which feeds the fuel through the metal-selective membrane 9, removing trace metals from the fuel composition. The permeate is then transported back to the fuel filter 3 and the retentate is captured in the waste tank 10.

Figure 4:
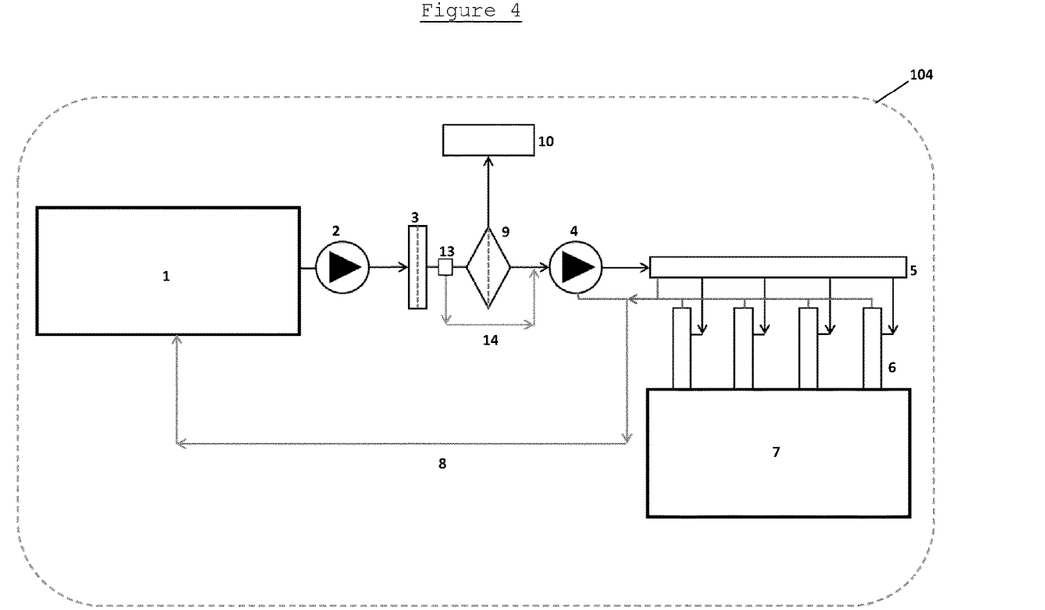
FIG. 4 is a block diagram which illustrates a fuel delivery system, wherein the metal-selective membrane is situated in the low-pressure line.

FIG. 4 illustrates a block diagram of a fourth configuration for a fuel delivery system 104 of a vehicle, in accordance with the concepts of the present disclosure. The fuel delivery system may comprise a fuel tank 1 which holds the fuel, a low-pressure pump 2 which pumps the fuel towards the fuel filter 3, filtering out large contaminants within the fuel before the fuel reaches a metal-selective membrane 9, removing metal contaminants from the fuel before transporting the permeate to the high-pressure pump 4, with the retentate being fed to the waste tank 10. Alternatively, in situations where the fuel delivery system is under high stress, a valve 13 will close and direct the fuel flow through the bypass line 14, bypassing the metal-selective membrane and transporting the fuel back to the fuel line. The high-pressure pump 4, pumps the fuel through the common rail 5, before transporting the fuel into the fuel injectors 6, and injecting the fuel into the internal combustion engine 7. Any excess fuel is transported via the return line 8, back to the fuel tank 1.

In FIGS. 1 to 4, the arrows denote the direction of flow of the fuel composition.

During the permeation process a shear-force over the membrane surface area is required to ensure stable permeation. A method for producing such shear-force is disclosed herein. An embodiment of the present invention as described in FIG. 2 may contain a short-circuit of pump 12 which is utilized to create a cross-flow across the surface area of the metal-selective membrane 9. This may create sufficient shear force to ensure a stable permeation process, which may prevent the induction of a concentration polarization effect. Similarly, the embodiments of the present invention according to FIG. 3 and FIG. 4 may incorporate devices located at the membrane surface, allow for sufficient hydrodynamics to prevent a drop in permeability. Suitably, such devices may be vibrational and/or ultrasonic in nature.

EXAMPLES

Example 1

A diesel feed fraction containing B0 (no bio component) was contaminated with zinc neodecanoate resulting in 5 mg/kg elemental zinc. The diesel fraction was contacted at a trans membrane pressure of 15 bar and a temperature of 30° C. with a non-porous polydimethylsiloxane (PDMS) membrane layer supported by a porous poly(acrylonitrile) (PAN) layer. The flux, permeability and permeate yield are shown in Table 1 below, as well as the level of Zn in the resulting permeate and retentate, the analysis of which was completed via Inductively Coupled Plasma Mass Spectrometry (ICP-MS). As shown in Table 1, the resulting permeate had a Zn content of lower than 0.1 mg/kg and the resulting retentate had a Zn content of 7.8 mg/kg+/−0.8 mg/kg.

Example 2

A diesel feed fraction containing B0 (no bio component) was contaminated with zinc neodecanoate resulting in 5 mg/kg elemental zinc. The diesel fraction was contacted at a trans membrane pressure of 15 bar and a temperature of 60° C. with a non-porous polydimethylsiloxane membrane layer supported by a porous poly(acrylonitrile) layer. The flux, permeability and permeate yield are shown in Table 1 below, as well as the level of Zn in the resulting permeate and retentate, the analysis of which was completed via Inductively Coupled Plasma Mass Spectrometry (ICP-MS). Table 1 shows the resulting permeate had a Zn content of lower than 0.1 mg/kg and the resulting retentate had a Zn content of 15.7 mg/kg+/−1.6 mg/kg.

TABLE 1

|  | Example 1 (30° C.) | Example 2 (60° C.) |
|---|---|---|
| Flux kg · m$^{-2}$ · hr$^{-1}$ | 2.8 | 6.8 |
| Permeability kg · m$^{-2}$ · hr$^{-1}$ · bar$^{-1}$ | 0.19 | 0.45 |
| Permeate yield % wt. | 49.7 | 53.5 |
| Zn in permeate mg/kg | <0.1 | <0.1 |
| Zn in retentate mg/kg | 7.8 +/− 0.8 | 15.7 +/− 1.6 |

Discussion

The analysis in Table 1 showed low Zn levels in both permeates. The conditions in Example 2 showed that at a higher temperature (60° C.) the level of Zn rejected from the feed had increased. In addition, a higher temperature (60° C.) showed a significant increase in permeability, from 0.19 kg·m$^{-2}$·hr$^{-1}$·bar$^{-1}$ to 0.45 kg·m$^{-2}$·hr$^{-1}$·bar$^{-1}$.

We claim:

1. A process for reducing injector deposits in an internal combustion engine which is fuelled with a fuel composition comprising a trace metal, the process comprising contacting the fuel composition with a non-porous or nanofiltration metal-selective membrane situated in a return line of a fuel delivery system which is configured to provide the fuel composition from an injector situated in the internal combustion engine to a fuel tank, wherein the fuel composition is a diesel fuel composition and wherein the internal combustion engine is a diesel engine, wherein the metal-selective membrane has an average pore size of at most 5 nm and is selected from polymers comprising units according to general formula: —Si(R)(R')—O— wherein R and R' represent moeities chosen from the groups consisting of hydrogen, halogen, alkyl, aryl, cycloalkyl, and aralkyl moieties.

2. The process according to claim 1, wherein the metal-selective membrane is selected from polydimethylsiloxane, poly (3,3,3) trifluoropropylmethylsiloxane, and mixtures thereof.

3. The process according to claim 1, wherein the metal-selective membrane is polydimethylsiloxane.

4. The process according to claim 1, wherein the trace metal is selected from transition metals, post-transition metals, alkali metals, and alkaline earth metals, and mixtures thereof.

5. The process according to claim 1, wherein the trace metal is selected from Zn, Cu, Fe, Na, K, Ca and Mg, and mixtures thereof.

6. The process according to claim 1, wherein the trace metal is selected from Zn, Cu, Ca and Na, and mixtures thereof.

7. The process according to claim 1, wherein the trace metal is Zn.

8. The process according to claim 1, wherein the injector deposits are internal diesel injector deposits.

9. A process for reducing injector deposits in an internal combustion engine which is fuelled with a fuel composition comprising a trace metal, the process comprising contacting the fuel composition with a non-porous or nanofiltration metal-selective membrane situated in a kidney loop filtration system which is configured to act upon a fuel tank, wherein the fuel composition is a diesel fuel composition and wherein the internal combustion engine is a diesel engine wherein the metal-selective membrane has an average size of at most 5 nm and is selected from polymers comprising units general formula: —Si(R)(R')—O— wherein R, and R' represent moieties chosen from the groups consisting of hydrogen halogen alkyl, aryl, cycloalkyl, and aralkyl moieties.

10. A process for reducing injector deposits in an internal combustion engine which is fuelled with a fuel composition comprising a trace metal, the process comprising contacting the fuel composition with a non-porous or nanofiltration metal-selective membrane situated in a return line of a fuel delivery system which is configured to provide the fuel composition from an injector situated in the internal combustion engine to a fuel filter, wherein the fuel composition is a diesel fuel composition and wherein the internal combustion engine is a diesel engine, wherein the metal-selective membrane has an average pore size of 0.5 to 5 am and is selected from polymers comprising units according to the general formula: —Si(R)(R')—O— wherein R and R' represent moieties chosen from the groups consisting of hydrogen halogen, alkyl aryl cycloalkyl, and aralkyl moieties.

11. A process for reducing injector deposits in an internal combustion engine which is fuelled with a fuel composition comprising a trace metal, the process comprising contacting the fuel composition with a non-porous or nanofiltration metal-selective membrane situated in a low-pressure line of a fuel delivery system which is configured to provide the fuel composition from a fuel tank to an injector, wherein the fuel composition is a diesel fuel composition and wherein the internal combustion engine is a diesel engine, wherein the metal-selective membrane has an average pore size of 0.5 to 5 nm and is selected from polymers comprising units according to the general formula: —Si(R)(R')—O— wherein R and R' represent moieties chosen from the groups consisting of hydrogen, halogen, alkyl, aryl, cycloalkyl, and aralkyl moieties.

* * * * *

UNITED STATES PATENT AND TRADEMARK OFFICE
CERTIFICATE OF CORRECTION

PATENT NO. : 12,023,632 B2
APPLICATION NO. : 17/638327
DATED : July 2, 2024
INVENTOR(S) : Robert Wilfred Matthews Wardle et al.

Page 1 of 1

It is certified that error appears in the above-identified patent and that said Letters Patent is hereby corrected as shown below:

In the Claims

In Column 7, Line 43, in Claim 1, after "to" insert -- the --.

In Column 7, Line 45, in Claim 1, delete "moeities" and insert -- moieties --.

In Column 8, Line 19, in Claim 9, delete "engine" and insert -- engine, --.

In Column 8, Line 20, in Claim 9, after "average" insert -- pore --.

In Column 8, Line 22, in Claim 9, after "units" insert -- according to the --.

In Column 8, Line 22, in Claim 9, delete "R," and insert -- R --.

In Column 8, Line 24, in Claim 9, delete "hydrogen" and insert -- hydrogen, --.

In Column 8, Line 24, in Claim 9, delete "halogen" and insert -- halogen, --.

In Column 8, Line 36, in Claim 10, delete "am" and insert -- nm --.

In Column 8, Lines 39-40, in Claim 10, delete "hydrogen" and insert -- hydrogen, --.

In Column 8, Line 40, in Claim 10, delete "alkyl" and insert -- alkyl, --.

In Column 8, Line 40, in Claim 10, delete "aryl" and insert -- aryl, --.

Signed and Sealed this
Twenty-second Day of October, 2024

Katherine Kelly Vidal
*Director of the United States Patent and Trademark Office*